(12) United States Patent
Wild (10) Patent No.: US 8,055,303 B2
(45) Date of Patent: Nov. 8, 2011

(54) METHOD OF AND BASE STATION FOR CONTROLLING BEAM FORMING IN A MOBILE CELLULAR NETWORK

(75) Inventor: Thorsten Wild, Stuttgart (DE)

(73) Assignee: Alcatel Lucent, Paris (FR)

( * ) Notice: Subject to any disclaimer, the term of this patent is extended or adjusted under 35 U.S.C. 154(b) by 332 days.

(21) Appl. No.: 12/472,712

(22) Filed: May 27, 2009

(65) Prior Publication Data

US 2009/0296663 A1 Dec. 3, 2009

(30) Foreign Application Priority Data

May 30, 2008 (EP) .................................... 08290502

(51) Int. Cl.
*H04M 1/00* (2006.01)
(52) U.S. Cl. .................. 455/562.1; 455/67.11; 455/450; 370/329
(58) Field of Classification Search ............... 455/63.1, 455/67.11, 67.13, 450, 452.1, 452.2, 453, 455/561, 562.1; 370/328, 329
See application file for complete search history.

(56) References Cited

U.S. PATENT DOCUMENTS 6,233,466 B1 * 5/2001 Wong et al. ............... 455/562.1
6,968,022 B1 * 11/2005 Poor et al. ..................... 375/346
2007/0249402 A1 10/2007 Dong et al.

FOREIGN PATENT DOCUMENTS

EP        0 841 827 A2   5/1998
WO   WO 2004/019622 A2   3/2004

OTHER PUBLICATIONS

European Search Report.

* cited by examiner

*Primary Examiner* — Quochien B Vuong
(74) *Attorney, Agent, or Firm* — Fay Sharpe LLP (57) ABSTRACT

The invention concerns a melhod and a base station for controlling beam forming in a mobile cellular network: Antenna units apply a respective beam pattern sequence on each sector of a cell served by the respective base station. A base station acts as trigger base station informing all neighbored base stations of the cluster not to change their beam pattern sequences. The trigger base station changes the beam pattern sequence applied on the sectors of its cell. The trigger base station triggers one or more mobile units to calculate signal quality parameters for currently applied beam pattern sequence. The trigger base station selects an optimal beam pattern sequence from the set based on the calculated signal quality parameters and applies as a new beam pattern sequence on the respective sector.

12 Claims, 3 Drawing Sheets

METHOD OF AND BASE STATION FOR CONTROLLING BEAM FORMING IN A MOBILE CELLULAR NETWORK

The invention is based on a priority application EP 08 290 502.7 which is hereby incorporated by reference.

TECHNICAL FIELD

The present invention relates to a method of and a base station for controlling beam forming in a mobile cellular network.

BACKGROUND OF THE INVENTION

The technical field of the present invention is directed to mobile cellular networks, in particular to improving of quality of service provided by base stations to mobile units, which access the base stations of the mobile cellular network by means of a wireless link. For instance, the method and the base station of the present invention are applicable to WiMAX (WiMAX=Worldwide Interoperability for Microwave Access), 3GPP LTE (3GPP LTE=$3^{rd}$ Generation Partnership Project Long Term Evolution) and systems beyond 3G (3G=$3^{rd}$ Generation).

A general problem of mobile cellular networks is signal quality which can be described in the signal-to-interference-plus-noise ratio (SINR). A typical mobile cellular network is divided into a plurality of cells controlled by means of base stations comprising antenna units. Base stations can handle a plurality of communications at the same time. Nowadays, the amount of mobile communication is increasing rapidly. Thus, bandwidth problems may arise due to interference problems originating from a limited frequency band available for communicating in the mobile cellular network. Beam antennas beamforming based on multiple antennas can be used to optimize radio communication between a mobile unit and a base station. However, if two mobile units are located close to each other and communicate with similar radio frequencies, spatial interference is unavoidable.

SUMMARY OF THE INVENTION

It is the object of the present invention to provide an improved beam forming in a mobile cellular network.

The object of the present invention is achieved by a method of controlling beam forming in a mobile cellular network, wherein antenna units of base stations of a cluster of neighbored base station s apply a respective beam pattern sequence on each sector of a cell served by the respective base station, wherein the beam pattern sequence is selected from a respective predefined set of beam pattern sequences and each beam pattern sequence defines a sequence of beam subsets used for communication with mobile units, one of the base stations of the cluster, which acts as trigger base station, informs all neighbored base stations of the cluster of neighbored base stations not to change their beam pattern sequence, the trigger base station controls the antenna unit of the trigger base station to change the beam pattern sequence applied on the sectors of the cell and to sequently apply two or more different beam pattern sequences of the predefined set of beam pattern sequences on the respective sector, or to send a set of orthogonal pilot signals, the trigger base station triggers one or more mobile units located in the cluster of neighbored base stations to calculate one or more signal quality parameters for currently applied beam pattern sequences of the trigger base station, or to calculate one or more signal quality parameters based on the received pilot signals and the knowledge of the antenna weights of the beam subsets for two or more beam pattern sequences, the trigger base station selects an optimal beam pattern sequence from the set of predefined beam pattern sequences based on the one or more calculated signal quality parameters, and the antenna unit of the trigger base station applies the optimal beam pattern sequence as a new beam pattern sequence on the respective sector. The object of the present invention is also achieved by a base station in a mobile cellular network, wherein the base station comprises a control unit for controlling beam forming, whereby the control unit controls an antenna unit of the base station in order to apply a beam pattern sequence on each sector of a cell served by the base station, wherein the beam pattern sequence is selected from a respective predefined set of beam pattern sequences and each beam pattern sequence defines a sequence of beam subsets used for communication with mobile units, the base station informs all neighbored base stations of a cluster of neighbored base stations not to change their beam pattern sequence, the base station controls the antenna unit to change the beam pattern sequence applied on the sectors of the cell and to sequently apply two or more different beam pattern sequences of the predefined set of beam pattern sequences on the respective sector, or to send a set of orthogonal pilot signals, the base station triggers one or more mobile units located in the cluster of neighbored base stations to calculate one or more signal quality parameters for currently applied beam pattern sequences of the base station, or to calculate one or more signal quality parameters based on the received pilot signals and the knowledge of the antenna weights of the beam subsets for two or more beam pattern sequences, the base station selects an optimal beam pattern sequence from the set of predefined beam pattern sequences based on the two or more calculated signal quality parameters, and the control unit controls the antenna unit of base station to apply the optimal beam pattern sequence as a new beam pattern sequence on the respective sector.

The present invention provides an adaptive method for controlling beam forming in a mobile cellular network. The method selects beam pattern sequences from a predefined set of beam pattern sequences. Those beam pattern sequences are sequently and periodically applied by antenna units of the base station on respective sectors of the respective cell of the mobile cellular network. Each cell can be divided into one or more sectors. On each sector of a cell a different beam pattern sequence or the same beam pattern sequence of the set of predefined beam pattern sequences can be applied by the antenna unit of the base station. It is possible to define the predefined set of beam pattern sequences so that spatial interference is reduced. Therefore, the method provides to cope with interference limitation of mobile communication systems based on mobile cellular networks by spatially avoiding interference. Furthermore, the usage of sequently used beam pattern sequences of a set of predefined beam pattern sequences allows for predicting spatial interference and therefore, makes it possible to prevent negatives effects of spatial interference on the mobile cellular communication. Thus, receiver capability improvements are possible in spatial interference suppression, since the spatial properties of interference are known in advance. For this purpose, beam pattern sequences are used which are selected from a predefined set of beam pattern sequences. Furthermore, the usage of fixed beams, i.e. beam pattern sequences of a predefined set of beams, admits for low-rate feedback and avoids the inclusion of dedicated pilots in the mobile cellular network. Inter-cell interference can be coordinated and consequently the inter-cell interference can be avoided at least to some extend or completely. Furthermore, to further improve the mobile cellular network, each base station triggers measurements, i.e. the calculation, of one or more signal quality parameters to determine its optimal beam pattern sequence. The optimal beam pattern sequence is the beam pattern sequence of the predefined set of beam pattern sequences which minimizes interference and maximizes throughput to mobile units of neighbored cells of the mobile cellular network. Therefore, it is possible to maximize the estimated total average potential throughput of the cell of the trigger base station and the respective neighbored cells of the respective neighbored base stations of the cluster of neighbored base stations. Therefore, it is possible for the trigger base station and for the mobile cellular network to react efficiently on changing locations and on changing amounts of mobile units.

Further advantages are achieved by embodiments of the present invention indicated by the dependent claims.

According to a preferred embodiment of the present invention, the method of controlling beam forming in a mobile cellular network, base stations of the cluster of neighbored base stations are informed about the sequent change of the beam subsets used for communication with mobile units in order to synchronize the sequent change of the beam subsets between said base stations of the cluster of neighbored base stations. Preferably, one or more base stations of the cluster of neighbored base station inform neighbored base stations by signaling the sequent change of the beam subset used for communication with mobile units. For instance, a short fixed signal pulse or a trigger signal is used for signaling the sequent change of the beam subset. It is possible to use inter-base station communication over backhaul to signal the sequent change of the beam subset. Therefore, it is possible to predict inter-cell interference and/or intra-cell spatial interference. The mobile units and/or base stations of the cluster of neighbored base stations can select in advance a filter technique. The filter technique can be applied to remove the inter-cell and/or intra-cell spatial interference, since the transmit weights of interfering base stations are now known based on the fixed beam pattern sequence. This can be used e.g. in a so-called optimum combining receiver, a linear receiver using the MMSE principle and second order statistic knowledge of the channels for spatial interference suppression. I.e. it is possible that the base stations of the cluster of neighbored base stations synchronously change within the beam pattern sequence the beam subsets used for communication with mobile units. By means of time synchronization between base stations and by signaling the used beam pattern sequence, the interference situation from one beam pattern sequence to another practically repeats, because beam pattern sequences are a periodic sequence or a cyclic sequence of beam subsets. Therefore, upcoming SIR (SIR=Signal to Interference Ratio) or SINR (SINR=Signal to Interference and Noise Ratio) can be known and/or predicted very precisely at the base station and/or at the mobile unit for each time instant by feedback signaling of past time instants from the previous beam pattern sequence. Accurate frequency selective scheduling and link adaptation between neighbored base stations of the cluster of neighbored base stations are possible. In addition, a receiver at the side of the mobile unit also benefits from accurate knowledge of the spatial properties of the interference.

According to a preferred embodiment of the invention, the trigger base station controls antenna unit of the trigger base station to change the beam pattern applied on the sector of the cell and sequently apply to a more different beam pattern sequences of the predefined set of beam pattern sequences on the respective sector. Then, the trigger base station triggers one or more mobile units located in the cluster of neighbor base stations to calculate one or more signal quality parameters for currently applied beamer pattern sequences of the trigger base station. According to a second approach, the trigger base station controls the antenna unit of the trigger base station to send a set of orthogonal pilot signals. Furthermore, the trigger base stations trigger one or more mobile units located in the cluster of neighbored base stations to calculate one or more signal quality parameter based on the received pilot signal and the knowledge of the antenna weights of the beam subsets for two or more of the beam pattern sequences. According to the second approach, it is no longer necessary to change the actual beam pattern sequences applied on the sector, but to simulate the signal quality resulting from the beam pattern sequences based on an evaluation of the received pilot signal and the antenna weights of the beam subset assigned to the respective beam pattern sequence.

According to a preferred embodiment of the present invention, the method of controlling beam forming in a mobile cellular network, the new beam pattern sequence applied by the trigger base station is signaled to one or more base stations of the cluster of neighbored base stations. Preferably, the trigger base station signals its new beam pattern sequence applied on its sectors to one or more base stations of the cluster of neighbored base stations. This means that said base stations forward the new beam pattern sequence to their one or more associated mobile units. This allows for an improved prediction of upcoming SIR or SINR by the mobile units, which can be used for selecting and applying filter techniques to improve a quality of service in communication.

In particular, associated mobile units are mobile units which are located in the cluster of neighbored base stations.

Preferably, a cell of the mobile cellular network comprises one or more sectors. The sectors can cover said cell completely. Preferably, the base station uses the same beam pattern sequence for each sector of its assigned cell of the mobile cellular network. The usage of the same beam pattern sequence for each cell reduces upcoming intra-cell spatial interference.

According to a preferred embodiment of the present invention, each base station of the cluster of neighbored base station uses a set of two or more beam subsets. Each beam subset comprises two or more beams selected from a group or set of, preferably predefined, beams available in order to minimize intra-cell spatial interference between the beams of the respective beam subset. Therefore, each base station of the cluster of neighbored base stations can define the beam subsets based on SDMA (SDMA=Space Division Multiple Access).

According to a preferred embodiment of the present invention, the method of controlling beam forming in a mobile cellular network, each base station of the cluster of neighbored base stations uses a predefined set of beam pattern sequences. Each beam pattern sequence comprises a number of successive beam subsets corresponding to a number of time slots used to communicate via time division multiplex with mobile units served by the respective base station of the cluster of neighbored base stations. It is possible that one of the successive beam subsets corresponds equally to one time slot used to communicate via time division multiplex with mobile units served by the respective base station of the cluster of neighbored base stations. It is also possible that the number of successive beam subsets corresponds to two or more time slots used to communicate via time division multiplex with mobile units served by the respective base station of the cluster of neighbored base stations in cases when more time slots than the number of beam subsets are available. In this a case, resources of the respective base station are used efficiently. Therefore, it is possible to provide a TDMA (TDMA=Time Division Multiple Access) to one or more mobile units. It is possible to increase a total cell throughput by reusing a time-frequency-code multiple access resources also in spatial dimension. By construction of the beam subsets and the corresponding beam pattern sequences spatial interference can be reduced or removed. Furthermore, the amount of mobile units served by a base station can be increased, if TDMA is applied on the beam pattern sequences, i.e. different mobile units are assigned to respective different time slots. In consecutive time windows different subsets of these fixed beams are used.

According to a preferred embodiment of the present invention, the method of controlling beam forming in a mobile cellular network, each beam of each beam subset is used to communicate with two or more mobile units at a same time slot based on frequency division multiplexing (e.g. by using a frequency resource of one or several OFDM subcarriers) or code division multiple access. Therefore, it is possible that each base station of the cluster of neighbored base stations defines the beam subsets based on FDMA (frequency division multiple access), OFDM (ODFM=orthogonal frequency division multiplex) or CDMA (CDMA=code division multiple access). By means of OFDM or CDMA the cell throughput can be further increased with respect to the preceding preferred embodiment of the present invention.

Time synchronization, which can be available, of a certain cluster of neighbored base stations can be exploited, e.g. for OFDM systems on OFDM symbol level, wherein the time delays of all received signals are within a cyclic prefix. Each base station can use a beam pattern sequence of multiple beams of the beam subset used for communicating with mobile units, whereby the beam pattern sequences are repeated cyclically. Neighbored base stations of the cluster of neighbored base stations and mobile units can know each other's beam pattern sequence via signaling and can use this knowledge for CQI (CQI=Channel Quality Indicator) measurements, link adaptation and interference suppression.

According to a preferred embodiment of the present invention, the method of controlling beam forming in a mobile cellular network, the trigger base station informs neighbored base stations about a sequence of the two or more different beam pattern sequences. Those beam pattern sequences are selected from the predefined set of beam pattern sequences to be applied on the respective sector of the cell. Said neighbored base stations send information about said sequence of the two or more different beam pattern sequences to two or more associated mobile units in order to assign each of the calculated signal quality parameters to the respective one of the beam pattern sequences applied on the respective sector of the cell. Therefore, the method can provide specific information on interference and/or signal quality parameters on specific beam pattern sequences of the predefined set of beam pattern sequences. It is possible that each base station and each mobile unit comprise a table which lists indexed the predefined set of beam pattern sequences. It is only necessary to signal the respective indices in sequential order corresponding to the sequence of the two or more different beam pattern sequences which reduces bandwidth used for administration of the mobile cellular network.

According to a preferred embodiment of the present invention, the method of controlling beam forming in a mobile cellular network, the trigger base station informs neighbored base stations about one or more types of signal quality parameters. The one or more types of signal quality parameters should be calculated by mobile units associated with the respective base station. Said neighbored base stations trigger one or more associated mobile units to calculate said one or more types of signal quality parameters. Preferably, the one or more types of signal quality parameters are a signal to interference ratio, i.e. SIR, or a signal to interference and noise ratio, i.e. SINR. Therefore, all neighbored base stations of the cluster of neighbored base stations forward the one or more types of signal quality parameters to one or more mobile units located in the cluster of neighbored base stations for calculation of the one or more signal quality parameters.

The method can achieve precise channel quality measurements and/or calculate signal quality parameters, like SIR or SINR, by predicting interference in a high dynamic system with strong fluctuations of the interference caused by fast changing weights of beam forming due to scheduling of different mobile units. Therefore, a more precise selection of transport formats is possible. This is due to the fact that all transmit weights of interfering base stations are know, as the sequence of beam pattern sequences is known.

According to a preferred embodiment of the present invention, the method of controlling beam forming in a mobile cellular network, the one or more mobile units located in the cluster of neighbored base stations send a result of a calculation of the one or more signal quality parameters for the currently applied beam pattern sequences of the trigger base station to their respective base station of the cluster of neighbored base stations. Said base stations, i.e. the neighbored base stations of the cluster of neighbored base stations, forward the received results of the calculation of the one or more signal quality parameters to the trigger base station.

According to a preferred embodiment of the present invention, the method of controlling beam forming in a mobile cellular network, the trigger base station receives the one or more signal quality parameters calculated by the one or more mobile units located in the cluster of neighbored base stations. Alternatively, it is possible that the one or more mobile units signal, instead of the calculated one or more signal quality parameters, a preferred beam pattern sequence as signal quality parameter. The trigger base station evaluates the received one or more signal quality parameters by means of an evaluation function returning an optimal beam pattern sequence of the set of predefined beam pattern sequences. The trigger base station can select the beam pattern sequence which optimizes the evaluation function, preferably a weighted sum, of the received one or more calculated signal quality parameters.

It is also possible, that the received one or more calculated signal quality parameters are preferred beam pattern sequences. In this case the mobile units can vote by means of votes for their preferred beam pattern sequence. The trigger base station can sum the votes of the preferred beam pattern sequences of the mobile units and the trigger base stations can select the beam pattern sequence which obtained the majority of votes by the mobile units.

According to a preferred embodiment of the present invention, after selection and application of the optimal beam pattern sequence as new beam pattern sequence, the role of the trigger base station is shifted to one of the other base stations of the cluster, which acts as new trigger base station. The new trigger base stations inform all neighbored base stations of the cluster of neighbored base stations not to change their beam pattern sequences. Then, the new trigger base station performs the other steps of the method of controlling beam forming in the mobile cellular network in order to determine an optimal beam pattern sequence as a new beam pattern sequence to be applied on its respective sectors. It is possible that the mobile cellular network is able to self-configure itself in each possible deployment which is desirable, since in practice deployments rarely give ideal hexagon shaped structures. The changes in beam pattern sequences allow the base stations to perform spatial interference avoidance adaptively. A beam pattern sequence can equivalently be called semi-static beam pattern sequence. Preferably, each base station of the cluster of neighbored base station acts successively or periodically as trigger base station in order to determine its optimal beam pattern sequence as new beam pattern sequence. Therefore, it is possible to adapt the cellular mobile network in a self-configurable way to operate with different base station deployments, which can be deviating from classical hexagonal structures, with different mobile unit densities and mobile unit distributions achieving satisfactory signal quality parameters and/or bandwidth.

It is also possible that the method is only applied to one or more of the sectors of the cell of the trigger base station. Correspondingly, only one or more beam pattern sequences can be selected as optimal beam pattern sequence by the trigger base station.

BRIEF DESCRIPTION OF THE DRAWINGS

These as well as further features and advantages of the invention will be better appreciated by reading the following detailed description of presently preferred embodiments taken with the accompanying drawings of.

DETAILED DESCRIPTION OF PREFERRED EMBODIMENTS

Figure 1:
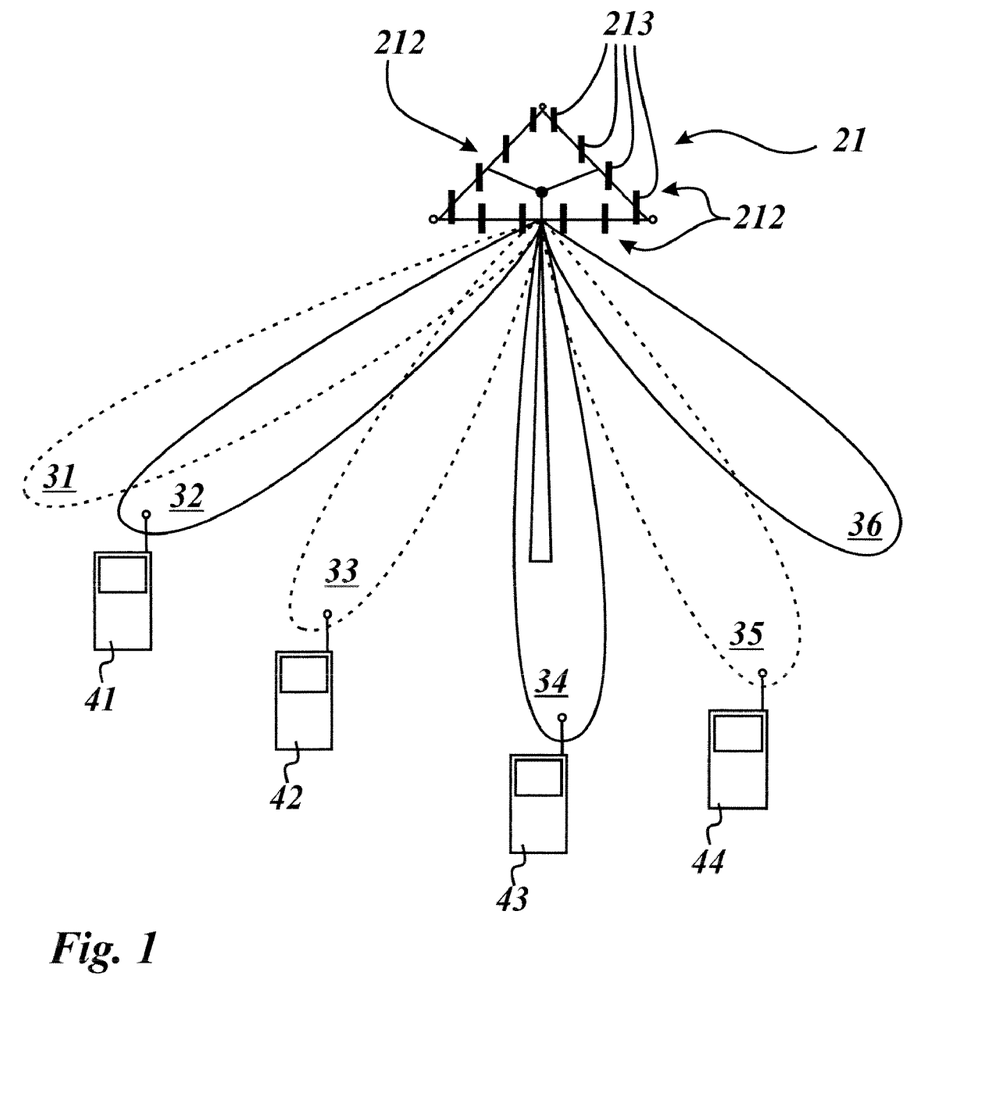
FIG. 1 shows a functional view of a base station with an antenna unit providing to four mobile units communication by means of two different beam pattern sequences.

FIG. 1 shows a base station 21 and four mobile units 41, 42, 43, 44 in one sector of a cell of a mobile cellular network. The base station 21 comprises three antenna units 212 wherein each of the antenna units 212 is assigned to a different sector of the cell. Each antenna unit 212 is formed of a linear antenna array with four equal linear antenna elements 213 arranged in parallel. The front antenna unit 212—in the following just called antenna unit 212—provides mobile cellular communication to the mobile units 41, 42, 43, 44 by means of beams 31, 32, 33, 34, 35, 36. The antenna unit 212 is able to apply the beams 31, 32, 33, 34, 35, 36 on the respective sector of the cell of the cellular mobile network under control of a control unit. Furthermore, the control unit of the base station 21 is adapted to execute the method of controlling beam forming in a mobile cellular network.

The control unit of the base station 21 is adapted to control the beam forming of the antenna unit 212 and to provide communication functionality for the base station 21 with other base stations and/or the mobile units 41, 42, 43, 44. The base stations are neighbored base stations of a cluster of neighbored base stations. Base stations of the cluster of neighbored base stations communicate with other base stations of the cluster of neighbored base stations via fixed communication lines of a core network. The base stations of the cluster of neighbored base stations provide a wireless access to the mobile units 41, 42, 43, 44 located in the cluster of neighbored base stations. In order to access wirelessly the base stations, the mobile units 41, 42, 43, 44 comprise a control unit, an antenna unit and a RF communication unit feeding the antenna unit. The control unit of a mobile unit controls the antenna unit of the mobile unit and provides wireless communication functionality for the mobile unit. Furthermore, the control unit of the mobile unit provides functionality for calculating and/or measuring signal quality parameters, like SIR, SNR (SNR=Signal to Noise Ratio) and/or SINR. The control unit of the mobile unit also provides functionality for sending, receiving and/or transmitting signals providing the wireless communication functionality between mobile units. Furthermore, the control unit of the mobile unit also provides functionality for sending, receiving and/or transmitting signals of the calculated and/or measured signal quality parameters.

In order to minimize intra-cell spatial interference, the beam subsets used for communication with the mobile units 41, 42, 43, 44 are preferably designed as follows:

Each beam pattern sequence is formed of a subset of beams. The beams are used to provide an optimal signal quality to mobile units located in the cell of a base station. The subset of beams has a spatial and angular distribution with minimal overlap between the beams, but maximizes at the same time the coverage of the sector. Antenna units 212 comprising n linear antenna elements 213 are used to form approximately 2n different beams. These different beams are fixed, i.e. predefined. Preferably, n is equal to four and nine different beams are formed. The nine beams are predefined and do not alter.

Figure 3:
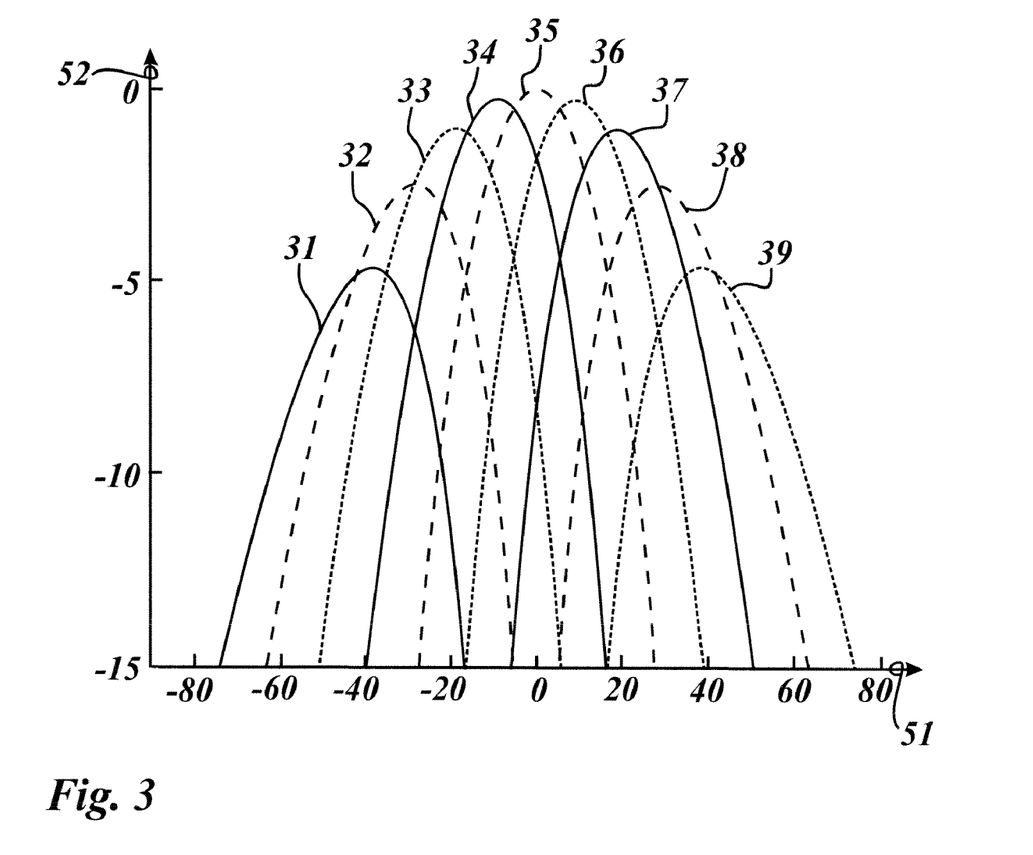
FIG. 3 shows a diagram of an angular distribution of relative intensities of nine different beams in a sector of a cell with logarithmic scale of the relative beam intensity.

FIG. 3 shows exemplarily a preferred angular distribution in degree 51 for nine different beams 31, 32, 33, 34, 35, 36, 37, 38, 39 wherein in direction 52 a logarithmic scale of a relative intensity of the nine beams 31, 32, 33, 34, 35, 36, 37, 38, 39 is indicated. These nine different beams 31, 32, 33, 34, 35, 36, 37, 38, 39 are optimally selected to reduce intra-cell spatial interference between two of these nine different beams 31, 32, 33, 34, 35, 36, 37, 38, 39. When using only each third beam for SDMA transmission on the same time-frequency resources, the intra-cell interference is kept sufficiently low in a macro-cellular environment.

In FIG. 1 six beams 31, 32, 33, 34, 35, 36 are applied on the sector by the antenna unit 212. The antenna unit 212 provides a linear antenna array with four linear antenna elements 213. For instance, it is possible to arrange the beams 31, 32, 33, 34, 35, 36 in one beam pattern sequence by means of a sequence of two beam subsets. In this case, one of the beam subsets comprises the beams 31, 33, 35 and whereas the other beam subset comprises the beams 32, 34, 36. In FIG. 1 the base station 21 provides communication to the mobile units 42 and 44 via the beam subset comprising the beams 31, 33, 35 and to the mobile units 41 and 43 via the beam subset comprising the beams 32, 34, 36. The two beam subsets are repeated alternately.

In particular, all beams 31, 32, 33, 34, 35, 36 are predefined. Each base station has a number of fixed beams available. Preferably, the antenna elements 213 of each sector of the cell are calibrated in phase to achieve the intended beam directions.

Figure 2:
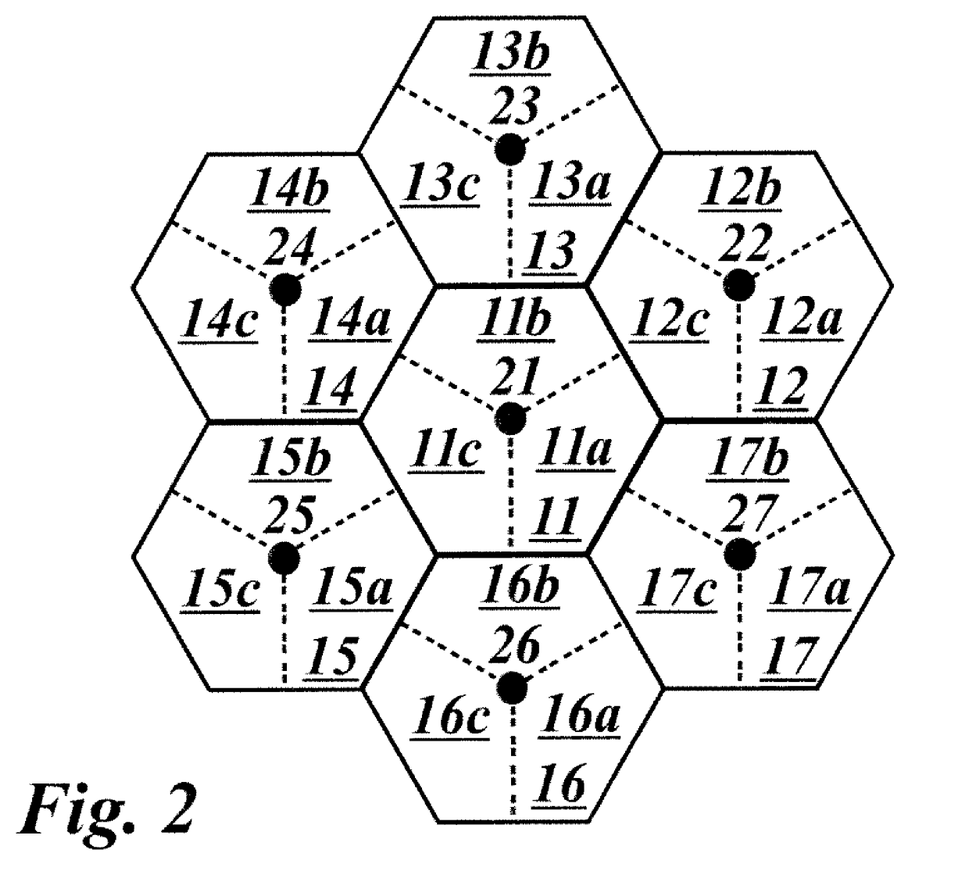
FIG. 2 shows a functional view of a cluster of seven neighbored base stations of a mobile cellular network placed hexagonally.

FIG. 2 shows a cluster of neighbored base stations 21, 22, 23, 24, 25, 26, 27. Each neighbored base station 21, 22, 23, 24, 25, 26, 27 is assigned to a cell 11, 12, 13, 14, 15, 16, 17, respectively, wherein each of the cells is subdivided in three equally sized sectors further labeled with a, b, c.

The method according to a preferred embodiment of the present invention of controlling beam forming in a mobile cellular network is as follows:

First, the antenna units controlled by the respective control unit of the base stations 21, 22, 23, 24, 25, 26, 27 of the cluster of neighbored base stations 21, 22, 23, 24, 25, 26, 27 apply a respective beam pattern sequence on each sector of the cell served by the respective base station. Each base station 21, 22, 23, 24, 25, 26, 27 comprises a control unit adapted to execute the method of controlling beam forming and enabling the base station to control its antenna unit. By means of the control unit the base stations 21, 22, 23, 24, 25, 26, 27 apply beams and/or beam pattern sequences with their antenna unit on one or more sectors of their cell. The base stations 21, 22, 23, 24, 25, 26, 27 communicate with other neighbored base stations of the cluster of neighbored base stations 21, 22, 23, 24, 25, 26, 27 and mobile units. Preferably, each cell is divided into three sectors, as shown in FIG. 2. The three sectors of the cover the cell completely. The beam pattern sequences are selected to form a predefined set of beam pattern sequences. Each beam pattern sequence is defined by a sequence of beam subsets, i.e. subsets of beams. Preferably, beam pattern sequences are self-repeating or cyclic. These subsets of beams are based on SDMA and on TDMA in order to minimize intra-cell and inter-cell interference and to provide communication to a plurality of mobile units. That means multi-stream transmission is done with multiple fixed beams at once within one sector to several mobile units.

In particular, for a certain time window, e.g. one TTI (TTI=Transmission Time Interval), each base station 21, 22, 23, 24, 25, 26, 27 uses a beam subset of these fixed beams for simultaneous transmission and for providing communication to mobile units. In order to avoid intra-cell interference the beam subsets are formed of "non-neighbored" beams, meaning that the main lobes of an antenna pattern or beam pattern sequence of the selected beams have a certain sufficient distance.

FIG. 3 shows three suitable beam subsets. The first beam subset comprises the beams 31, 34, 37. The second beam subset comprises the beams 32, 35, 38. The third beam subset comprises the beams 33, 36, 39. Therefore, by means of SDMA several mobile units are served simultaneously on a same time-frequency-code resource separated by beam directions. These three beam subsets have small spatial interference.

Furthermore, the beam pattern sequence is selected from a respective predefined set of beam pattern sequences. Each beam pattern sequence defines a sequence of beam subsets used for communication with mobile units, i.e. in consecutive time slots different subsets of these fixed beams are used.

In particular, the duration of each beam pattern sequence of each base station 21, 22, 23, 24, 25, 26, 27 is identical. The duration of each beam pattern sequence of each base station 21, 22, 23, 24, 25, 26, 27 is not too long in comparison to a channel coherence time. This ensures that all the interference constellations within a certain time slot remain approximately constant and are periodically repeated with the beam pattern sequence time duration. This further ensures that an SINR observed by a mobile unit will re-occur one beam pattern sequence time duration later. The beam pattern sequence time duration should be long enough that there is sufficient time for feedback signaling delay and processing of the scheduler, i.e. the control unit of the base station 21.

Therefore, one beam pattern sequence repetition later it is possible, that the SINR for link adaptation is known very well in advance. This improves the transport format selection at the time when the scheduling decision is made. Additionally the receiver, i.e. a base station or a mobile unit, e.g. using optimum ratio combining, already is aware of or is able to predict the spatial properties of an incoming interference. Therefore, it is possible to remove at least partially the incoming interference.

From a practical point of view, an optimal choice of beam subsets and beam pattern sequences is important in order to maximize the throughput of the mobile cellular network. The optimum choice of the beam pattern sequence of each base station 21, 22, 23, 24, 25, 26, 27 depends on a user distribution, i.e. a distribution of mobile units, within the mobile cellular network. It also depends on the geometrical position of each base station 1, 22, 23, 24, 25, 26, 27 and on characteristics of an environment of the base stations 21, 22, 23, 24, 25, 26 and 27 in terms of obstacles, scatters etc. Thus, this optimum choice can not be precomputed in a practical system, because the distribution of mobile units is changing over time in each cell of the mobile cellular network. Therefore, the selection of beam pattern sequences applied by the antenna units of the base station should be self-optimizing.

The self-optimization means a change in the beam pattern sequence for a certain base station 21, which is e.g. better suited to avoid inter-cell interference. In order to avoid high signaling overhead, the changes of beam pattern sequences could be done in the order of seconds or even longer. This is a typical time scale for changes in the angle of departures due to the movement of mobile units.

The beam pattern sequences are semi-static. Preferably, in a simple case all beam pattern sequences are identical at all base stations 21, 22, 23, 24, 25, 26, 27. The beam pattern sequences at all base stations 21, 22, 23, 24, 25, 26, 27 have a different offset in number of time slots. It is possible to provide a table listing possible different beam pattern sequences of each base station 21, 22, 23, 24, 25, 26, 27 of the cluster of neighbored base stations 21, 22, 23, 24, 25, 26, 27.

However, an optimal choice of an optimal beam pattern sequence as new beam pattern sequence applied to the sectors of base station 21 by means of the antenna unit 212 requires signal quality measurements or a calculation of one or more signal quality parameters. In the cluster of neighbored base stations 21, 22, 23, 24, 25, 26, 27 only one base station at a time should consider to change its beam pattern sequence to provide a simple adaptation procedure. Preferably, every 1 to 10 seconds another base station of the cluster of neighbored base stations 21, 22, 23, 24, 25, 26, 27 is triggering the calculation of one or more signal quality parameters in order to improve its beam pattern sequence by means of replacing the present beam pattern sequence with a new beam pattern sequence which is an optimal beam pattern sequence. The calculation of the one or more signal quality parameters is carried out by the mobile units. The base station which has triggered the calculation receives results form the mobile units corresponding to their calculated one or more signal quality parameters. Depending on the received result the base station selects a new beam pattern sequence. Preferably, each mobile unit feeds back its best beam index or best beam pattern sequence. It is always assumed that the best beam index is available as feedback in all modes of operation. The 'best beam pattern sequence' feedback is then additionally required in the case where this self-optimising beam pattern sequence adaptation procedure is triggered. The beam index is a label to identify a beam pattern sequence. Further, in case of adaptive scheduling is desired also a SINR of its time-frequency-code resources is fed back by the mobile unit.

A base station 21 which wants to change its presently applied beam pattern sequence is called trigger base station. The trigger base 21 informs all neighbored base stations 22, 23, 24, 25, 26, 27 of the cluster of neighbored base stations 21, 22, 23, 24, 25, 26, 27. It is possible that the trigger base station triggers a complete search over all existing beam pattern sequences. Preferably, a table of all existing beam pattern sequences, i.e. a pattern table, is held at a database provided at one or more base stations 21, 22, 23, 24, 25, 26, 27 of the cluster of neighbored base stations 21, 22, 23, 24, 25, 26, 27. In case that a large number of beam pattern sequences is available, the search is carried out over a subset of the existing beam pattern sequences.

The neighbored base stations 22, 23, 24, 25, 26, 27 trigger their associated mobile units in their sectors. The mobile units by default calculate a SINR for the currently applied beam pattern sequences. The SINRs can be frequency-selective. Additionally the mobile units have to calculate the SINRs by taking into account all potential beam pattern sequences of the trigger base station 21. The neighbored base stations 22, 23, 24, 25, 26, 27 collect the results calculated by the mobile units. The neighbored base stations 22, 23, 24, 25, 26, 27 send these collected results to the trigger base station 21. The trigger base station 21 selects—based on the received results comprising SINRs of the mobile units—the beam pattern sequence which results in an estimated potential highest throughput.

In order to reduce feedback signaling overhead, alternatively each mobile unit does not sent the calculated one or more signal quality parameters as the calculated result, but only feeds back its preferred beam pattern sequence. The calculated results of the mobile units are counted by their respectively assigned neighbored base station 22, 23, 24, 25, 26, 27. The neighbored base station 22, 23, 24, 25, 26, 27 can determine or select a beam pattern sequence preferred by the mobile units of the neighbored base station 22, 23, 24, 25, 26, 27 which is favorable for the relative majority of mobile units. This choice can now be signaled back to the trigger base station 21 by the neighbored base station 22, 23, 24, 25, 26, 27. The trigger base station 21 can select its preferred beam pattern sequence as new beam pattern sequence of its sectors in the same manner as the neighbored base station 22, 23, 24, 25, 26, 27.

In short, the method of controlling beam forming in the mobile cellular network is as follows:

One of the base stations 21 of the cluster of neighbored base stations 21, 22, 23, 24, 25, 26, 27 which acts as trigger base station 21, informs all neighbored base stations 22, 23, 24, 25, 26, 27 of the cluster. The trigger base station 21 controls the antenna unit 212 of the trigger base station 21 to change the beam pattern sequence applied on the sectors 11a, 11b, 11c of the cell 11, wherein two or more different beam pattern sequences of the predefined set of beam pattern sequences on the respective sector 11a, 11b, 11c are sequently applied. The trigger base station 21 triggers one or more mobile units located in the cluster of neighbored base stations 21, 22, 23, 24, 25, 26, 27 to calculate one or more signal quality parameters for currently applied beam pattern sequences by the trigger base station 21.

Furthermore, it is possible to simulate the signal quality parameter resulting from change of the beam patterned sequences applied on the sector by means of evaluating pilot signals received by the one or more mobile units. In a mobile communication system with common pilots and a codebook of beam weights, the trigger base station does not have to change its pattern. The mobiles do a channel estimation of the raw channel based on those common pilots, and now can test the different alternative beam pattern sequences. This is done by calculating the effective channel, which is a product of the raw channel matrix and the beam weight vector of the corresponding beam index from the beam subset of the beam pattern sequence. The beam weights simply can be read out from a table stored in the mobile unit. Based on those effective channels, e.g. the resulting SINR can be estimated and the 'beam pattern sequence' can be chosen which maximizes this SINR.

The trigger base station 21 selects an optimal beam pattern sequence from the set of the predefined beam pattern sequences based on the one or more calculated signal quality parameters. The antenna unit 212 of the trigger base station 21 applies the optimal beam pattern sequence as a new beam pattern sequence on the sectors 11a, 11b, 11c of the cell 11 or on the respective sector.

By means of FIG. 2 and FIG. 3, a further example of a preferred embodiment of the present invention is presented. Each base station 21, 22, 23, 24, 25, 26 and 27 is assigned to a cell 11, 12, 13, 14, 15, 16 and 17, respectively. Each cell 11, 12, 13, 14, 15, 16 and 17 comprises three sectors indicated by a further label a, b and c. Each of the base station 21, 22, 23, 24, 25, 26 and 27 is equipped with an antenna unit formed as an 4-element linear array. With this antenna unit, nine different beams 31, 32, 33, 34, 35, 36, 37, 38, 39 are formed according to FIG. 3, including tapering for side lobe suppression.

With these nine beams 31, 32, 33, 34, 35, 36, 37, 38, 39, three subsets comprising three beams each are formed. Each subset comprising three beams forms a beam pattern sequence, according to table 1.

Table 1 shows three subsets with each having three beams assigned.

| Subset Index | Beam |
| --- | --- |
| 1 | 31 + 34 + 37 |
| 2 | 32 + 35 + 38 |
| 3 | 33 + 36 + 39 |

Table 2 shows the six different beam pattern sequences which can be formed out of the temporal order of those subsets.

| Pattern Index | Subset Index |
| --- | --- |
| 1 | 1, 2, 3 |
| 2 | 1, 3, 2 |
| 3 | 2, 3, 1 |
| 4 | 2, 1, 3 |
| 5 | 3, 1, 2 |
| 6 | 3, 2, 1 |

For instance, pattern index 2 reads as sequentially applying the beams of subset 1 comprising the beams 31, 34, 37, followed by the subset 3, comprising the beams 33, 36, 39, further followed by the subset 2, comprising the beams 32, 35, 36 and then starts again from the beginning with the subset 1.

The same pattern index is used in all three sectors of a base station to ensure avoidance of inter-sector or inter-cell interference.

FIG. 2 shows an exemplary deployment of seven neighbored base stations 21, 22, 23, 24, 25, 26, 27. Each base station 21, 22, 23, 24, 25, 26, 27 has a different time assigned for triggering the calculation of signal quality parameters, i.e. its beam pattern sequence measurements. For instance, base station 21 starts at time t and does trigger its the next measurements at time t+7, t+14 and so on. Base station 22 triggers its measurements at time t+1, t+8, t+15 and so on. Now, this basic cluster of neighbored base stations 21, 22, 23, 24, 25, 26, 27 can be repeated for larger areas and/or mobile cellular networks providing more than seven base stations.

The mobile cellular network initially begins with all base stations using the beam pattern sequence with pattern index 1. At time t the base station 21 starts to trigger pattern measurements, i.e. the calculation of one or more signal quality parameters. All mobile units assigned to the base stations 21, 22, 23, 24, 25, 26, 27 have to calculate six additional SINR values under the assumption that the base station 21 is using the pattern indices 1 to 6. The beam pattern sequence with the pattern index providing the best result in total in estimated sum throughput of base stations 21, 22, 23, 24, 25, 26, 27 is select as optimal beam pattern sequence by the base station 21. The base station 21 switches to the corresponding pattern. Finally, the new pattern of base station 21 is signaled to all further base stations 22, 23, 24, 25, 26, 27. The neighbored base stations 22, 23, 24, 25, 26, 27 inform their associated mobile units of the change of the beam pattern sequence.

The invention claimed is:

1. A method of controlling beam forming in a mobile cellular network,
wherein
the method comprises the steps of:
applying, by antenna units of base stations of a cluster of neighbored base stations, a respective beam pattern sequence on each sector of a cell served by the respective base station, wherein the beam pattern sequence is selected from a respective predefined set of beam pattern sequences and each beam pattern sequence defines a sequence of beam subsets used for communication with mobile units,
informing, by one of the base stations of the cluster which acts as trigger base station, all neighbored base stations of the cluster of neighbored base stations not to change their beam pattern sequence,
controlling, by the trigger base station, the antenna unit of the trigger base station to change the beam pattern sequence applied on the sectors of the cell and sequently apply two or more different beam pattern sequences of the predefined set of beam pattern sequences on the respective sector, or to send a set of orthogonal pilot signals,
triggering, by the trigger base station, one or more mobile units located in the cluster of neighbored base stations to calculate one or more signal quality parameters for currently applied beam pattern sequences of the trigger base station, or to calculate one or more signal quality parameters based on the received pilot signals and the knowledge of the antenna weights of the beam subsets for two or more beam pattern sequences selecting, by the trigger base station, an optimal beam pattern sequence which minimizes interference and maximizes throughput to mobile units of neighbored cells of the mobile cellular network from the set of the predefined beam pattern sequences based on the one or more calculated signal quality parameters, and
applying, by the antenna unit of the trigger base station, the optimal beam pattern sequence as new beam pattern sequence on the respective sector.

2. The method of controlling beam forming in a mobile cellular network according to claim 1,
wherein the method comprises the further step of:
informing base stations of the cluster of neighbored base stations about the sequence change of the beam subsets used for communication with mobile units in order to synchronize the sequence change of the beam subsets between said base stations of the cluster of neighbored base stations.

3. The method of controlling beam forming in a mobile cellular network according to claim 1,
wherein the method comprises the further steps of:
signaling to one or more base stations of the cluster of neighbored base stations the new beam pattern sequence applied by the trigger base station, and
forwarding, by said base stations the new beam pattern sequence to their one or more associated mobile units.

4. The method of controlling beam forming in a mobile cellular network according to claim 1,
wherein the method comprises the further step of:
using, by each base station of the cluster of neighbored base stations, a set of two or more beam subsets, wherein each beam subset comprises two or more beams selected from a group of available beams in order to minimize intra-cell spatial interference between the beams of the respective beam subset.

5. The method of controlling beam forming in a mobile cellular network according to claim 1,
wherein the method comprises the further step of:
using, by each base station of the cluster of neighbored base stations, a predefined set of beam pattern sequences, wherein each beam pattern sequence comprises a number of successive beam subsets corresponding to a number of time slots used to communicate via time division multiplex with mobile units served by the respective base station of the cluster of neighbored base stations.

6. The method of controlling beam forming in a mobile cellular network according to claim 1,
wherein the method comprises the further step of:
using each beam of each beam subset to communicate with two or more mobile units at a same time slot based on orthogonal frequency division multiplex or code division multiple access.

7. The method of controlling beam forming in a mobile cellular network according to claim 1,
wherein the method comprises the further steps of:
informing, by the trigger base station, neighbored base stations about a sequence of the two or more different beam pattern sequences selected from the predefined set of beam pattern sequences to be applied on the respective sector of the cell, and
sending, by said neighbored base stations, to two or more associated mobile units information about said sequence of the two or more different beam pattern sequences in order to assign each of the calculated signal quality parameters to the respective one of the beam pattern sequences applied on the respective sector of the cell.

8. The method of controlling beam forming in a mobile cellular network according to claim 1,
wherein the method comprises the further steps of:
informing, by the trigger base station, neighbored base stations about one or more types of signal quality parameters which should be calculated by mobile units associated with the respective base station, and
triggering, by said neighbored base stations, one or more associated mobile units to calculate said one or more types of signal quality parameters.

9. The method of controlling beam forming in a mobile cellular network according to claim 1,
wherein the method comprises the further steps of:
sending, by the one or more mobile units located in the cluster of neighbored base stations, a result of a calculation of the one or more signal quality parameters for the currently applied beam pattern sequences of the trigger base station to their respective base station of the cluster of neighbored base stations, and forwarding, by said neighbored base stations, the received results of the calculation of the one or more signal quality parameters to the trigger base station.

10. The method of controlling beam forming in a mobile cellular network according to claim 1,
wherein the method comprises the further steps of:
receiving, by the trigger base station, the one or more signal quality parameters calculated by the one or more mobile units located in the cluster of neighbored base stations, and
evaluating, by the trigger base station, the received one or more signal quality parameters by means of an evaluation function returning the optimal beam pattern sequence of the set of predefined beam pattern sequences.

11. The method of controlling beam forming in a mobile cellular network according to claim 1,
wherein the method comprises the further step of:
after selection and application of the optimal beam pattern sequence as new beam pattern sequence,
informing, by one of the base stations of the cluster which acts as new trigger base station, all neighbored base station of the cluster of neighbored base stations not to change their beam pattern sequences.

12. A base station in a mobile cellular network, wherein the base station comprises a control unit for controlling beam forming, the control unit is adapted to:
control an antenna unit of the base station in order to apply a beam pattern sequence on each sector of a cell served by the base station,
wherein the beam pattern sequence is selected from a respective predefined set of beam pattern sequences and each beam pattern sequence defines a sequence of beam subsets used for communication with mobile units,
inform all neighbored base stations of a cluster of neighbored base stations not to change their beam pattern sequence,
control the antenna unit of the base station to change the beam pattern sequence applied on the sectors of the cell and sequently apply two or more different beam pattern sequences of the predefined set of beam pattern sequences on the respective sector, or to send a set of orthogonal pilot signals,
trigger one or more mobile units located in the cluster of neighbored base stations to calculate one or more signal quality parameters for currently applied beam pattern sequences of the base station, or to calculate one or more signal quality parameters based on the received pilot signals and the knowledge of the antenna weights of the beam subsets for two or more beam pattern sequences
select an optimal beam pattern sequence which minimizes interference and maximizes throughput to mobile units of neighbored cells of the mobile cellular network from the set of predefined beam pattern sequences based on the one or more calculated signal quality parameters, and
control the antenna unit of the base station to apply the optimal beam pattern sequence as new beam pattern sequence on the respective sector.

* * * * *